(12) United States Patent
Gorman et al.

(10) Patent No.: US 6,711,127 B1
(45) Date of Patent: Mar. 23, 2004

(54) SYSTEM FOR INTRUSION DETECTION AND VULNERABILITY ANALYSIS IN A TELECOMMUNICATIONS SIGNALING NETWORK

(75) Inventors: David B. Gorman, Gaithersburg, MD (US); Gregory J. Catherine, Germantown, MD (US); Richard Peragine, Catonsville, MD (US); Beverly Conrad, Timonium, MD (US); G. Duane Gearhart, Baltimore, MD (US); David Moy, Columbia, MD (US)

(73) Assignee: General Dynamics Government Systems Corporation, Needham, MA (US)

( * ) Notice: Subject to any disclaimer, the term of this patent is extended or adjusted under 35 U.S.C. 154(b) by 0 days.

(21) Appl. No.: 09/127,241

(22) Filed: Jul. 31, 1998

(51) Int. Cl.[7] .................................................. H04J 3/14
(52) U.S. Cl. ...................... 370/230; 370/522; 379/230; 713/201
(58) Field of Search ................................ 370/230, 235, 370/236, 252, 385, 403, 410, 522, 524; 713/200, 201; 709/223, 224, 225; 379/229, 230

(56) References Cited

U.S. PATENT DOCUMENTS

| | | | | |
|---|---|---|---|---|
| 5,440,723 A | * | 8/1995 | Arnold et al. ................. | 714/33 |
| 5,586,254 A | * | 12/1996 | Kondo et al. ................. | 707/104 |
| 5,621,889 A | * | 4/1997 | Lermuzeaux et al. ......... | 714/26 |
| 5,623,601 A | * | 4/1997 | Vu ............................... | 713/202 |
| 5,757,924 A | * | 5/1998 | Friedman et al. ........... | 713/153 |

OTHER PUBLICATIONS

Slides for KingsMen Program, "Network and Signal Infrastructure Vulnerability Analysis System," Feb. 25, 1997.

ANSI for Telecommunications–Signalling System No. & (SS7)—Message Transfer Part (MTP), ANSI T1.111–1992.

ANSI for Telecommunications–Signalling System No. & (SS7)—Integrated Services Digital Network (ISDN) User Part, ANSI T1.113–1995.

* cited by examiner

Primary Examiner—Chau Nguyen
Assistant Examiner—Soon-Dong Hyun
(74) Attorney, Agent, or Firm—Jenner & Block LLP

(57) ABSTRACT

Detecting attempted intrusions in a telecommunications signaling network and assessing the vulnerability of the network to attempted intrusions. Intrusion rules are applied to received messages in the network in real-time, using a known protocol for the network, in order to detect anomalies tending to indicate an attempted intrusion. In order to assess the vulnerability of the network, vulnerability rules are applied to rankings of particular parameters relating to elements in the network. The rankings provide an indication of susceptibility of a network element to an attempted intrusion relative to other network elements.

39 Claims, 7 Drawing Sheets

SYSTEM FOR INTRUSION DETECTION AND VULNERABILITY ANALYSIS IN A TELECOMMUNICATIONS SIGNALING NETWORK

FIELD OF THE INVENTION

The present invention relates to a system and method for detecting intrusion into, and for assessing the vulnerability of, a telecommunications signaling network.

BACKGROUND OF THE INVENTION

Telecommunications signaling networks are susceptible to intrusion, meaning that a person may use software or physical means to cause disruption or denial of service within the network. For example, a person may use software operating on a computer in an attempt to seize control of a particular node or link in the network and consequently cause a disruption or denial of service. As another example, a person may attempt to take physical control of an entity in the network, such as a link, resulting in a disruption or denial of service.

These intrusions create an undesirable situation for communications service providers and for customers using the network. In particular, the disruptions or denials of service may inconvenience customers and potentially cause a loss in revenue for the communications service provider. When a disruption occurs, a service provider may attempt to locate the disruption and determine a cause of the intrusion. However, in that case the service provider only obtains an indication of the intrusion after it has already caused a disruption and thus cannot anticipate such an intrusion before it occurs. In addition, the service provider may not necessarily know in advance which portions of the network are most susceptible to an intrusion and thus not know how to best monitor the network for potential intrusion.

Accordingly, a need exists for detection of intrusion in a telecommunications signaling network, potentially in real-time, and for analysis of the vulnerability of the telecommunications signaling network to an intrusion.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

SUMMARY OF THE INVENTION

Figure 1:
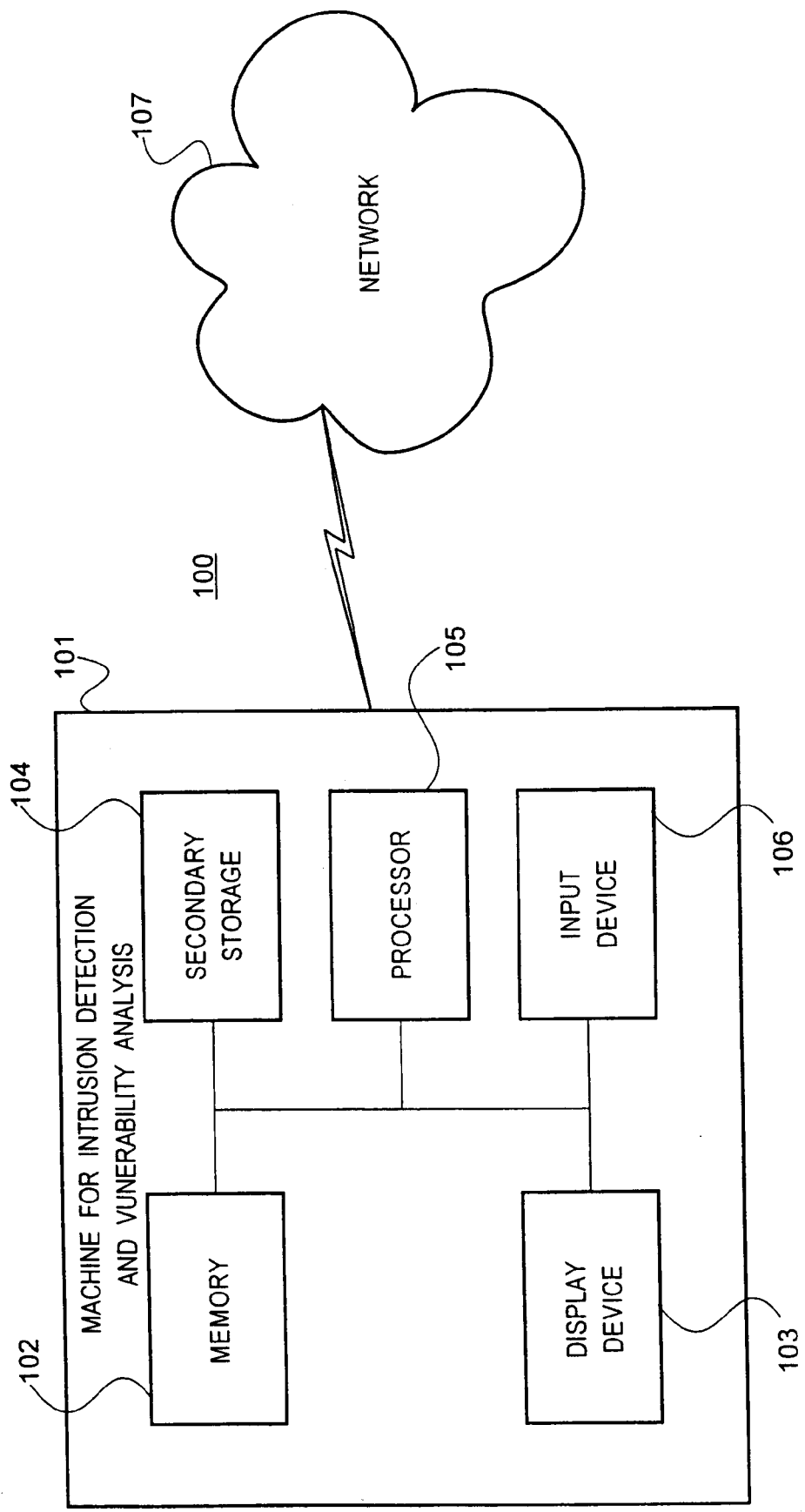
FIG. 1 is a diagram of an exemplary telecommunications signaling network and associated machine for monitoring the network.

Apparatus and methods consistent with the present invention provide indications of attempted intrusions in a telecommunications signaling network and the vulnerability of particular elements in the network to attempted intrusions.

An apparatus consistent with the present invention receives messages related to communications in a telecommunications signaling network. The apparatus applies intrusion rules to the messages in order to detect anomalies in the messages, and it reports an indication of the detected anomalies.

Another apparatus consistent with the present invention receives rankings for particular parameters related to elements of a telecommunications signaling network. The apparatus applies vulnerability rules to the rankings in order to determine a likelihood of an attempted intrusion into the corresponding elements of the telecommunications signaling network, and it reports an indication of the likelihood of the attempted intrusions.

A method consistent with the present invention includes receiving messages related to communications in a telecommunications signaling network. Intrusion rules are applied to the messages in order to detect anomalies in the messages, and an indication of the detected anomalies is reported.

Another method consistent with the present invention includes receiving rankings for particular parameters related to elements of a telecommunications signaling network. Vulnerability rules are applied to the rankings in order to determine a likelihood of an attempted intrusion into the corresponding elements of the telecommunications signaling network, and an indication of the likelihood of the attempted intrusions is reported.

DETAILED DESCRIPTION

Apparatus and methods consistent with the present invention provide indications of attempted intrusions in a telecommunications signaling network and the vulnerability of particular elements in the network to attempted intrusions. Although both intrusion detection and vulnerability analysis are described, each is typically a separate entity, and the operation of one is not necessarily dependent on the other.

Attempted intrusions refers to attempts to disrupt or deny service in the network or to otherwise tamper with the network. Intrusion rules are applied to received messages in the network, typically in real-time and using a known protocol for the network, in order to detect anomalies tending to indicate an attempted intrusion. Messages refers to any particular data element transmitted in the network. For example, standard telecommunications signaling networks use messages in order to provide particular telephone-related services to customers. Intrusion rules refers to any criteria or methodology for detecting the anomalies. Indications of the attempted intrusions may be presented, for example, in a user interface that includes a topological representation of a monitored portion of the network.

In order to assess the vulnerability of the network, vulnerability rules are applied to rankings of particular parameters relating to elements in the network. Vulnerability rules refers to any criteria or methodology for processing the rankings to provide indications of likelihood of attempted intrusions with respect to particular elements in the network. Rankings refers to any information providing an indication of susceptibility of particular network element to an attempted intrusion relative to one or more other network elements. A user interface may be presented in order to receive the rankings and to display indications of the vulnerability of elements in the network.

FIG. 1 depicts a data processing system 100 suitable for practicing methods and systems consistent with the present invention. Data processing system 100 includes a machine 101 for intrusion detection and vulnerability analysis, connected to a network 107 such as a private or public telecommunications signaling network. Machine 101 includes a memory 102, a secondary storage device 104, a processor 105 such as a central processing unit, an input device 106, and a display device 103. Memory 102 and secondary storage 104 may store applications and data for execution and use by processor 105. Input device 106 may be used to enter information and commands into machine 101, and display device 103 provides a visual of information in machine 101.

Although machine 101 is depicted with various components, one skilled in the art will appreciate that this computer can contain additional or different components. Additionally, although machine 101 is shown connected to network 107, machine 101 may be connected to other networks, including other wide area networks or local area networks. Furthermore, although aspects of the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet; or other forms of RAM or ROM. In addition, the computer-readable media may include instructions for controlling a computer system, such as machine 101, to perform a particular method.

Figure 2:
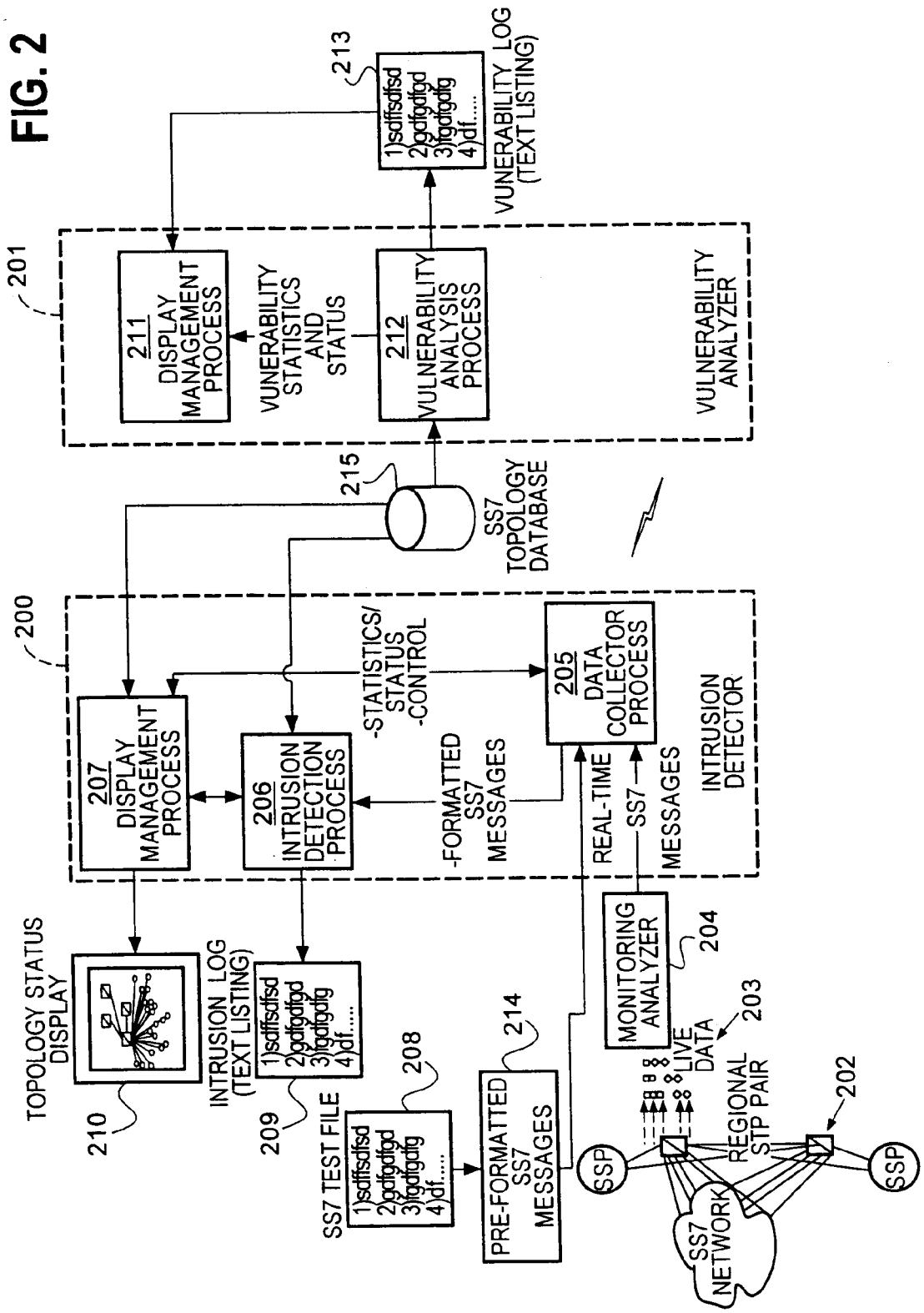
FIG. 2 is a diagram of software modules operating on the machine shown in FIG. 1 for implementing an embodiment consistent with the present invention.

FIG. 2 is a diagram of software modules operating on the machine shown in FIG. 1 for implementing an embodiment consistent with the present invention. These modules include modules 200 for intrusion detection and modules 201 for vulnerability analysis of a network 202. Network 202 is a standard Signaling System 7 (SS7) protocol network and illustrates an example of network 107. Other examples of network 107 include an Integrated Services Digital Network (ISDN) and an X.25 network. A monitoring analyzer module 204 receives real-time data 203 from network 202. Real-time data 203 may include messages transmitted in an SS7 protocol network or other type of network. Monitoring analyzer 204 packages the data for analysis and forwards it in real-time to a data collector process module 205. Data collector process module 205 parses the received data to remove information from the messages not necessary for intrusion analysis, and it reformats the parsed messages to a consistent format to facilitate intrusion analysis. Data collector process module 205 alternatively may receive preformatted SS7 protocol messages 214 from a test file 208 for use in testing or verifying the intrusion detection capabilities of the system.

An intrusion detection process module 206 receives the reformatted messages and performs processing of the messages to detect intrusion. In particular, it applies intrusion detection rules to the messages in order to detect anomalies in the messages or other events tending to indicate an attempt at intrusion into the network or to otherwise tamper with the network. These rules may be stored in memory or in a database such as memory 102 or secondary storage 104, or they may be implemented in hard-wired logic. Examples of these rules are provided in the Appendices. After or during performance of the intrusion detection processing, intrusion detection process module 206 outputs the results to an intrusion log 209 that maintains a time-stamped history of the processing in the form of a textual listing, and it outputs the results to a display management process module 207. The textual listing may be printed in hard copy form using a printer connected to machine 101 or may be displayed on display device 103.

Display management process module 207 formats the processed data for display within a topology status display 210, which may be displayed by display device 103. Topology status display 210 provides a visual indication of the status of the monitored network and indications of intrusions into the network, and an example of a user interface for the topology status display is described below.

A topology database 215 stores information representing a topology or interconnectivity of network 202. Intrusion detection process module 206 and display management process module 207 may access database 215 in order to retrieve the topology information and use it in the processing performed by those modules. In addition, topology database 215 may store the rules used by intrusion detection process module 206. Topology database 215 may correspond to secondary storage 104, and it may be implemented, for example, with a Sybase database.

Vulnerability analyzer modules 201 include a vulnerability analysis process module 212 and a display management process module 211. Vulnerability analysis process module 212 receives the network topology information from topology database 215, and it applies vulnerability rules to the topology information in order to determine the vulnerability of elements in network 202 to intrusion attempts. Examples of these rules are provided in the Appendices. Vulnerability analysis process module 212 outputs he results of its analysis to a vulnerability log 213, which maintains a time-stamped textual history of the processing in the form of a textual listing, and it also outputs the results to a display management process module 211. The textual listing may be printed in hard copy form using a printer connected to machine 101 or may be displayed on display device 103.

Display management process module 211 operates in a similar manner as module 207. In particular, it receives output results from module 212 and formats the received data for presentation in a user interface by display device 103. An example of a user interface for presenting the vulnerability process data is described below.

Figure 3:
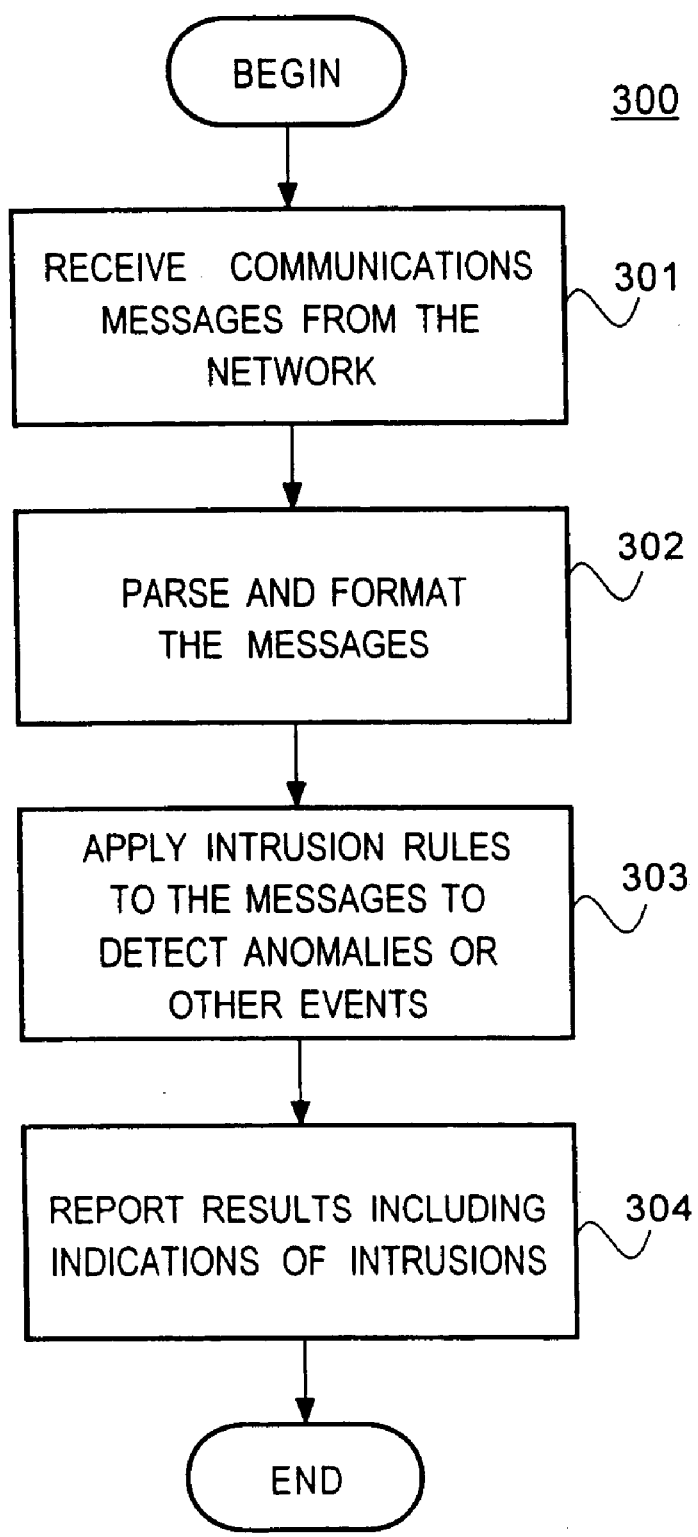
FIG. 3 is a flow chart of an exemplary process for monitoring a telecommunications signaling network for intrusion detection.

FIG. 3 is a flow chart of an exemplary process 300 for monitoring a telecommunications signaling network for intrusion detection. Process 300 may be implemented on machine 100 operating under control of intrusion detector modules 200 and module 204. In process 300, the system receives communication messages from the network such as SS7 messages provided by monitoring analyzer module 204 from network 202 (step 301). The system parses and formats the messages using data collector process module 205 (step 302). Intrusion rules are applied by intrusion detection process a module 206 to the formatted messages to detect anomalies or other events in the network tending to indicate an attempted intrusion (step 303). The results are reported and potentially displayed by display device 103, using intrusion log 209 or topology status display 210, to provide a visual indication of attempted intrusions into network 202 and potentially the status of the network (step 304).

Figure 4:
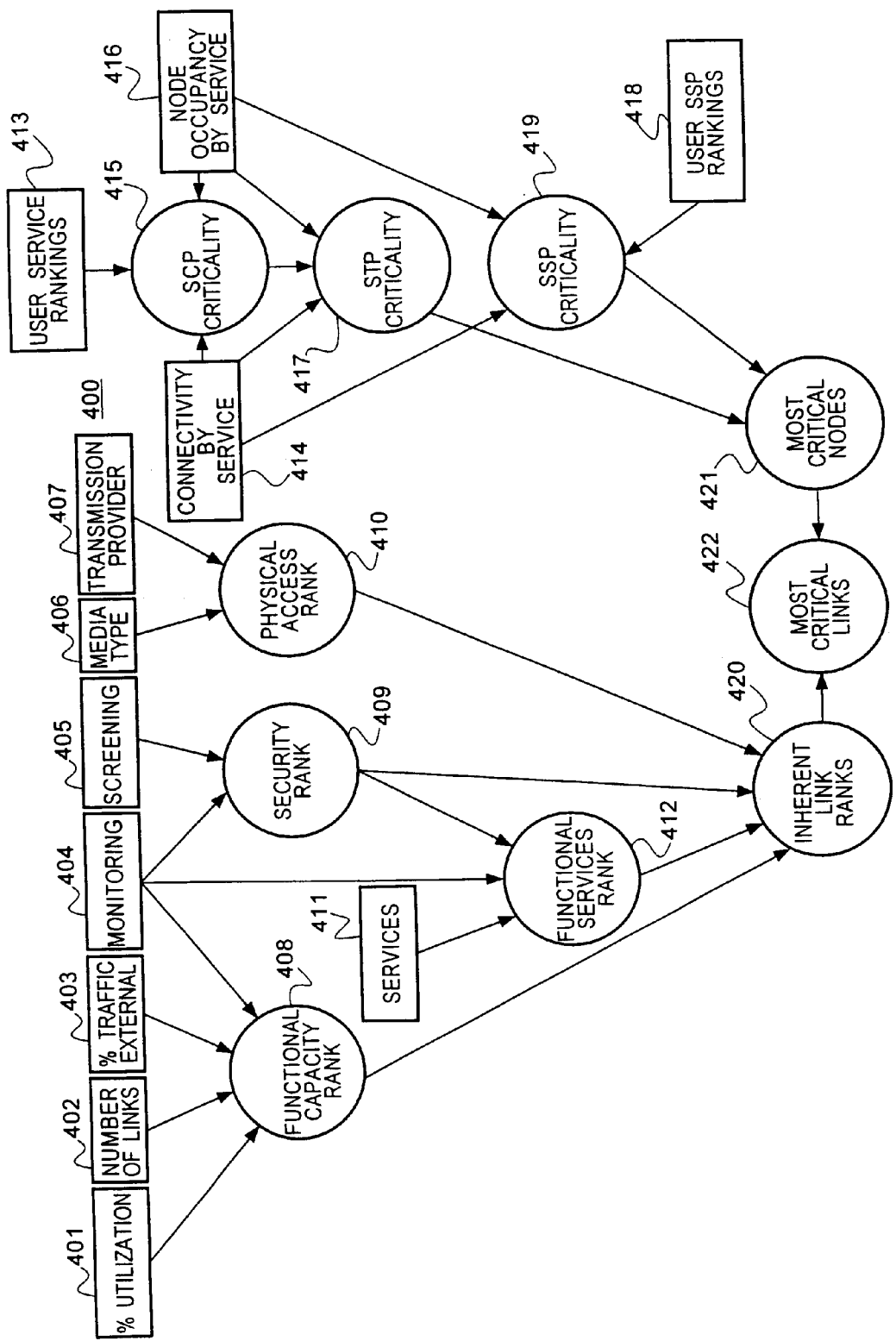
FIG. 4 is a flow chart of an exemplary process for determining vulnerability of a telecommunications signaling network to potential intrusion.

FIG. 4 is a flow chart of an exemplary process 400 for determining vulnerability of a telecommunications signaling network to potential intrusions. Process 400 may be implemented on machine 100 operating under control of vulnerability analyzer modules 201. Process 400 operates by using static rankings processed as input weightings according to particular rules to generate further rankings. The process may be performed iteratively such that the output from one particular processing rule may be input as a ranking to another rule. The boxes in process 400 represent static rankings for particular parameters related to the network, and the circles represent vulnerability rules for processing the rankings. Examples of these vulnerability rules are provided in the Appendices.

Examples of parameters providing rankings as particular weightings for processing by vulnerability rules include the following: a percent utilization 401, a number of links 402, a percent traffic external 403, a monitoring 404, a screening 405, a media type 406, a transmission provider 407, a services 411, a user service ranking 413, a connectivity by service 414, a node occupancy by service 416, and a user SSP ranking 418. These parameters are explained in the Appendices, and different or additional parameters may be used to perform a vulnerability analysis of a telecommunications signaling network.

Each parameter produces a static rank, in this example a particular number, to be processed by vulnerability rules. A functional capacity rank rule 408 receives input from parameters 401–404 and produces a result according to the function of rule 408. A security rank rule 409 receives input from parameters 404 and 405 and produces a result according to the function of rule 409. A physical access rank rule 410 receives input from parameters 406 and 407 and produces a result according to the function of rule 410. A functional services rank rule 412 receives as input parameters 411 and 404, as well as the output from rule 409, and produces a result according to the function of rule 412. The process continues iteratively as an inherent link ranks rule 420 receives the output from rules 408, 409, 410, and 412, and produces a result according to the function of rule 420. Rule 420 provides one input to a most critical links rule 422.

The following provides the other input to most critical links rule 422. An SCP criticality rule 415 receives as input parameters 413, 414, and 416, and it produces a result according to the function of rule 415. An STP criticality rule 417 receives as input parameters 414 and 416, and the output of rule 415, and it produces a result according to the function of rule 417. An SSP criticality rule 419 receives as in put pa parameters 414, 416, and 418, and it produces a result according to the function of rule 419. As the process proceeds iteratively, a most critical nodes rule 421 receives the output from rules 417 and 419, and it provides the other input to most critical links rule 422. Therefore, as a result of this iterative process, the result of rule 422 provides an indication of the most vulnerable link in the network, and the result of rule 421 provides an indication most vulnerable node in the network, the phrase "most vulnerable" meaning that it is the element most likely to be susceptible to an attempt intrusion.

Figure 5:
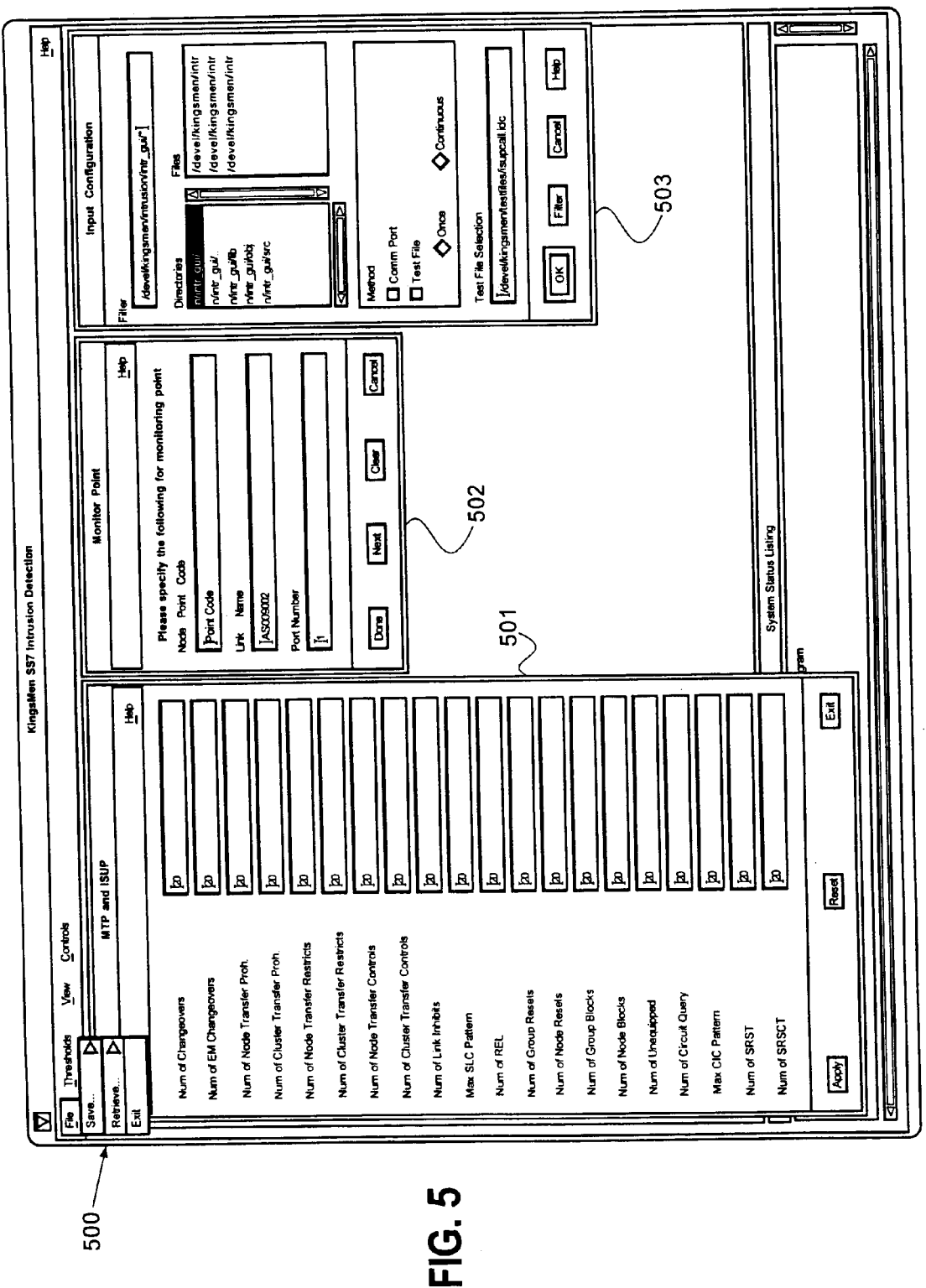
FIG. 5 is an exemplary user interface for entering set-up information for an intrusion detection process.

FIG. 5 is an exemplary user interface 500 for use in entering set-up information for an intrusion detection process such as process 300. User interface 500 may be displayed on display device 103. User interface 500 includes a first section 501 used to receive threshold values for detection of intrusion, a second section 502 used to identify a point in the network from which the intrusion detection process receives data, and a third section 503 used to save and retrieve set-up information so that a user need not repeatedly enter the same set-up information. A user may enter relevant information into sections 501 and 502 using input device 106, and section 502 identifies where data 203 originates in network 202 and thus provides a reference point for performing an intrusion detection process. The location where the data originates may typically be changed so that a user may monitor the network from varying locations, and the location may be selected by using, for example, results of a vulnerability analysis.

Figure 6:
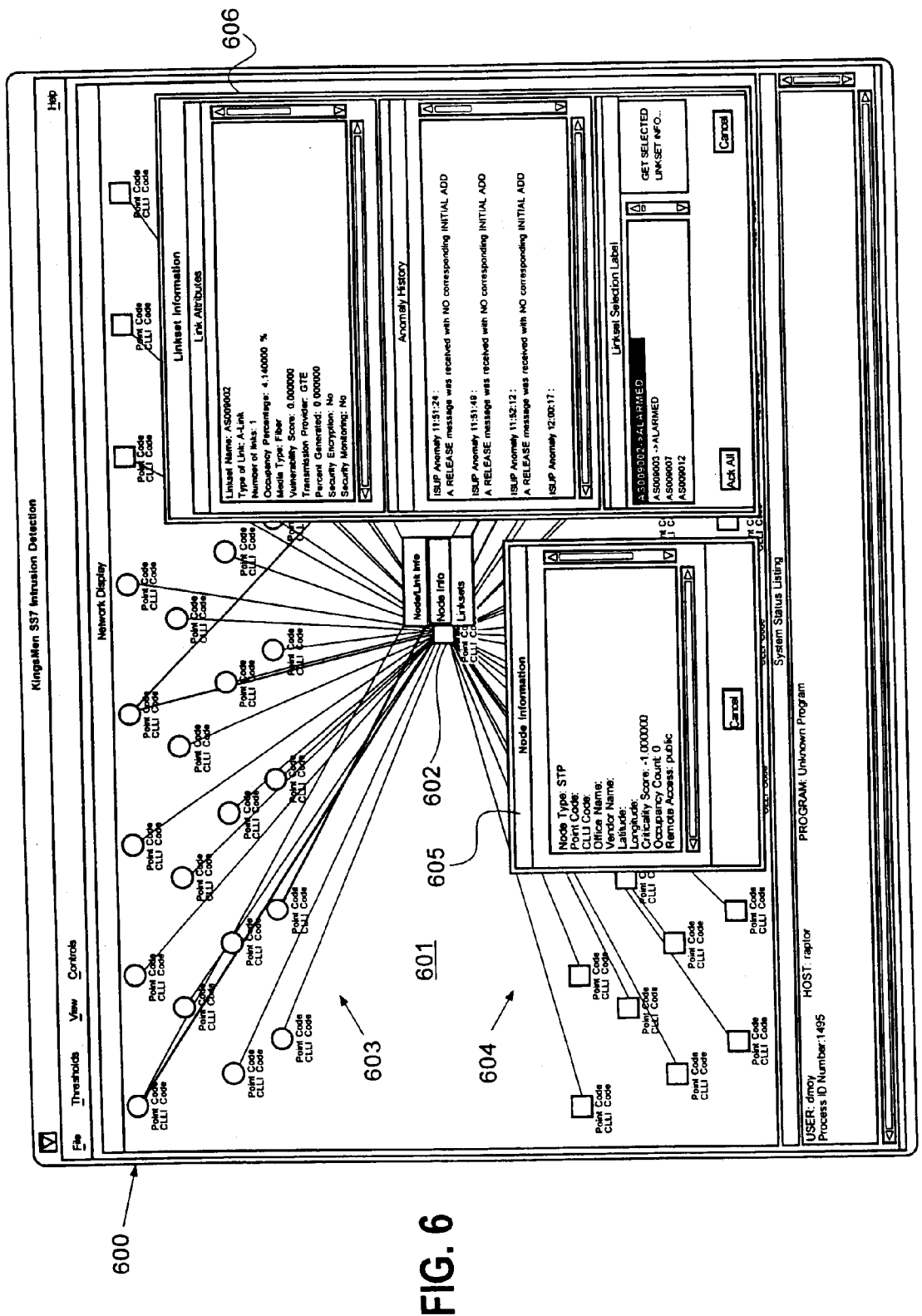
FIG. 6 is an exemplary user interface for displaying status information related to an intrusion detection process.

FIG. 6 is an exemplary user interface 600 for displaying status information related to intrusion detection such as information produced by process 300. User interface 600 may be displayed on display device 103. User interface 600 includes a main section 601 for displaying a topological representation of a portion of the network and including information indicative of various conditions in the network. These conditions may provide an indication of attempted intrusions in the network. A displayed node 602 corresponds to the node identified in section 502 of user interface 500, and node 602 represents the node from which the system receives data. Other displayed nodes 603 and 604 represent nodes located one link away from node 602 in the monitored network. Each of the displayed nodes includes associated point codes and link information, displayed adjacent the corresponding node. Section 601 also displays lines between the nodes, and the lines represent the corresponding links.

When a user selects a particular displayed node the system displays a section 605 for presenting node information relating to the selected node. The node information may include a ranking determined by a vulnerability analysis. When a user selects a displayed link, the system displays a section 606 for presenting static information relating to the selected link, including link attributes, an anomaly history, and a linkset selection label. The anomaly history may correspond to history log 209. The user may select a particular node or link by, for example, using a cursor-control device to "click on" the particular node or link.

The system may optionally present the links in different colors to provide indications of varying conditions. For example, it may present the links using the following colors: green for a normal condition; yellow for a minor condition; orange for a major condition; red for a critical condition; and gray to indicate that the link is not monitored. The various conditions may be determined by the detected anomalies from module 206 and particular predefined thresholds, which are further explained in the Appendices.

Figure 7:
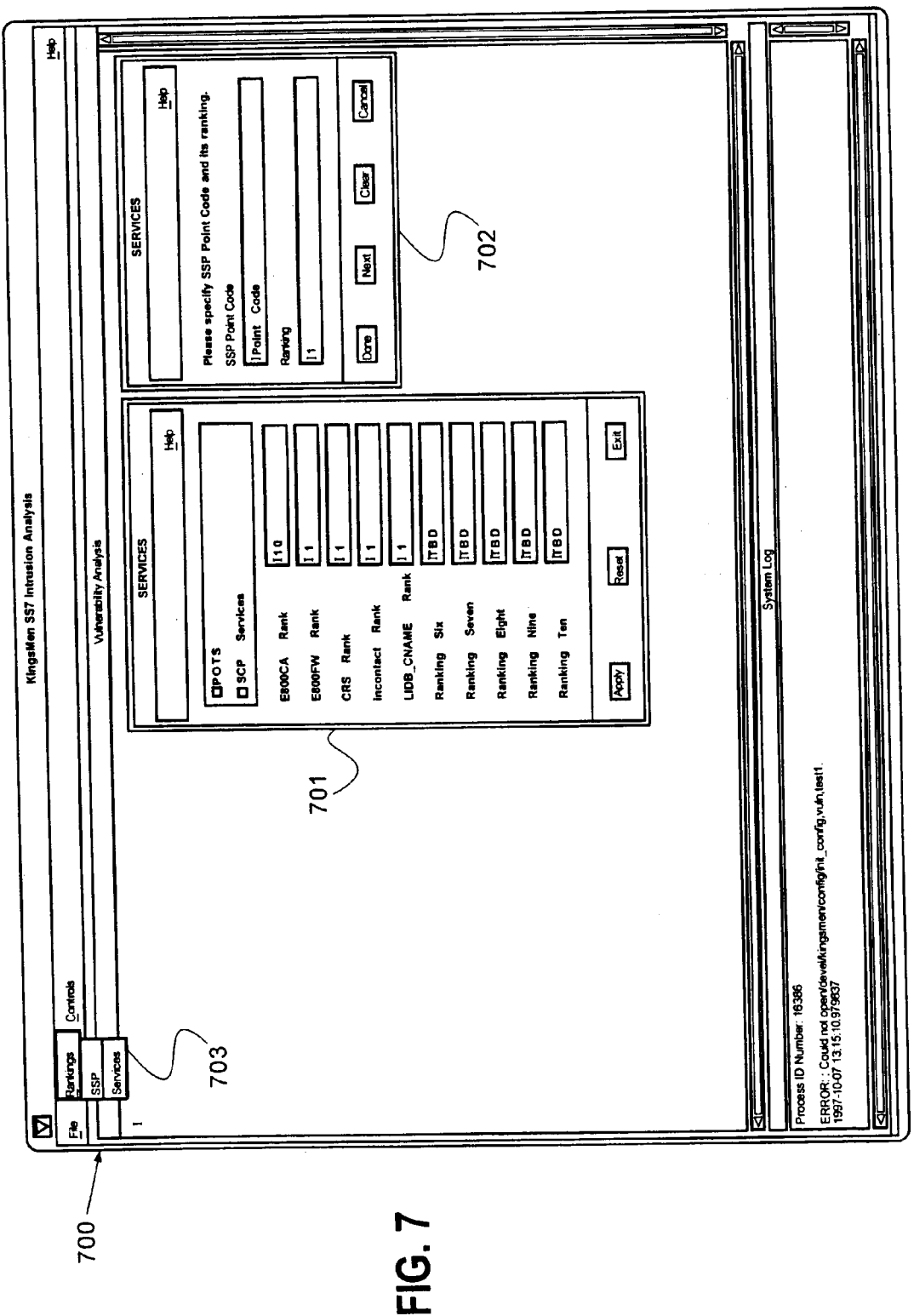
FIG. 7 is an exemplary user interface for displaying information related to a vulnerability analysis of a telecommunications signaling network.

FIG. 7 is an exemplary user interface 700 for displaying information related to a vulnerability analysis such as process 400. User interface 700 may be displayed on display device 103. User interface 700 includes various sections in which a user may enter rankings for use by the rules in process 400. For example, it includes a section 701 to receive values for a services ranking and a section 702 to receive values for an SSP ranking. A user may select an appropriate tab 703 on a menu bar to view the corresponding section 701 and 702. User interface 700 may include additional tabs 703 and sections for receiving information concerning other rankings.

The accompanying Appendices, which are incorporated in and constitute a part of this specification, include the following: Appendix A includes a system overview for an exemplary intrusion detection process and vulnerability analysis; Appendix B includes a software user's manual for an exemplary intrusion detection process and vulnerability analysis; Appendix C includes a software design document for an exemplary intrusion detection process and vulnerability analysis; Appendix D includes a description of exemplary vulnerability analysis attributes and algorithms including vulnerability rules; and Appendix E includes a description of exemplary intrusion detection algorithms including intrusion rules.

While the present invention has been described in connection with a preferred embodiment, many modifications will be readily apparent to those skilled in the art, and this application is intended to cover any adaptations or variations thereof. For example, different intrusion rules, different vulnerability rules, other types of user interfaces and hardware for presenting the user interfaces, and other types of programming languages for implementing an embodiment consistent with the present invention, may be used without departing from the scope of the invention. This invention should be limited only by the claims and equivalents thereof.

What is claimed is:

1. An apparatus for providing indications of attempted intrusion in a telecommunications signaling network, comprising:
   means for receiving network messages related to communications in the telecommunications signaling network;
   means for applying intrusion rules to the network messages in order to detect anomalies in the network messages;
   means for classifying the detected anomalies according to particular criteria; and
   means for reporting an indication of the classifications of the detected anomalies.

2. The apparatus of claim 1 wherein the receiving means includes means for receiving predefined test network messages.

3. The apparatus of claim 1 wherein the receiving means includes means for parsing and formatting the network messages as required for the application of the intrusion rules.

4. The apparatus of claim 1 wherein the applying means includes means for comparing the network messages with information related to a known protocol for the telecommunications signaling network.

5. The apparatus of claim 1 wherein the reporting means includes
   means for presenting in a user interface a topological representation of a portion of the telecommunications signaling network.

6. The apparatus of claim 5 wherein the reporting means includes
   means for presenting in the user interface indications of alarms representing the attempted intrusions.

7. An apparatus for determining a vulnerability of a telecommunications signaling network to attempted intrusions, comprising:
   means for receiving rankings for particular parameters related to elements of the telecommunications signaling network;
   means for applying vulnerability rules to the rankings in order to determine a likelihood of an attempted intrusion into the corresponding elements of the telecommunications signaling network, including means for determining a particular type of vulnerability of the corresponding elements; and
   means for reporting an indication of the likelihood of the attempted intrusions, including means for determining, based upon the particular type of vulnerability, an action affecting the corresponding elements in order to reduce the likelihood of the attempted intrusion in the corresponding elements.

8. The apparatus of claim 7 wherein the receiving means includes
   means for presenting a user interface for receiving the rankings.

9. The apparatus of claim 7 wherein the applying means includes
   means for combining the rankings according to particular criteria in order to produce numerical results providing indications of the likelihood of the attempted intrusions relative to the corresponding elements in the telecommunications signaling network.

10. The apparatus of claim 7 wherein the reporting means includes
    means for reporting a most vulnerable node and a most vulnerable link in the telecommunications signaling network.

11. A method for providing indications of attempted intrusion in a telecommunications signaling network, comprising:
    receiving network messages related to communications in the telecommunications signaling network;
    applying intrusion rules to the network messages in order to detect anomalies in the network messages;
    classifying the detected anomalies according to particular criteria; and
    reporting an indication of the classifications of the detected anomalies.

12. The method of claim 11 wherein the receiving step includes receiving predefined test network messages.

13. The method of claim 11 wherein the receiving step includes parsing and formatting the network messages as required for the application of the intrusion rules.

14. The method of claim 11 wherein the applying step includes comparing the network messages with information related to a known protocol for the telecommunications signaling network.

15. The method of claim 11 wherein the reporting step includes presenting in a user interface a topological representation of a portion of the telecommunications signaling network.

16. The method of claim 15 wherein the reporting step includes presenting in the user interface indications of alarms representing the attempted intrusions.

17. A method for determining a vulnerability of a telecommunications signaling network to attempted intrusions, comprising:
    receiving rankings for particular parameters related to elements of the telecommunications signaling network;
    applying vulnerability rules to the rankings in order to determine a likelihood of an attempted intrusion into the corresponding elements of the telecommunications signaling network, including determining a particular type of vulnerability of the corresponding elements; and
    reporting an indication of the likelihood of the attempted intrusions, including determining, based upon the particular type of vulnerability, an action affecting the corresponding elements in order to reduce the likelihood of the attempted intrusion in the corresponding elements.

18. The method of claim 17 wherein the receiving step includes presenting a user interface for receiving the rankings.

19. The method of claim 17 wherein the applying step includes combining the rankings according to particular criteria in order to produce numerical results providing indications of the likelihood of the attempted intrusions relative to the corresponding elements in the telecommunications signaling network.

20. The method of claim 17 wherein the reporting step includes reporting a most vulnerable node and a most vulnerable link in the telecommunications signaling network.

21. The apparatus of claim 1 wherein the reporting means includes means for generating, based upon the intrusion rules, a time-stamped listing of the classification of anomalies and the corresponding network messages.

22. The apparatus of claim 1 wherein the reporting means includes means for generating statistics, based on particular criteria, concerning the network messages.

23. An apparatus for providing indications of attempted intrusion in a telecommunications signaling network, comprising:

means for receiving a first message related to communications in the telecommunications signaling network and referring to a particular link in the network;

means for applying an intrusion rule to the first message in order to detect anomalies in the first message, including determining if a second message of a predefined type was previously detected on the particular link; and means for reporting an indication of the detected anomalies.

24. The method of claim 11 wherein the reporting step includes generating, based upon the intrusion rules, a time-stamped listing of the classification of anomalies and the corresponding network messages.

25. The method of claim 11 wherein the reporting step includes generating statistics, based on particular criteria, concerning the network messages.

26. A method for providing indications of attempted intrusion in a telecommunications signaling network, comprising:

receiving a first message related to communications in the telecommunications signaling network and referring to a particular link in the network;

applying an intrusion rule to the first message in order to detect anomalies in the first message, including determining if a second message of a predefined type was previously detected on the particular link; and reporting an indication of the detected anomalies.

27. A system for analyzing network communications, comprising:

a monitoring analyzer module to selectively receive data transmitted in said network;

a data collector process module to receive said data from said monitoring analyzer module and to parse and reformat said data into reformatted data;

an intrusion detection process module to receive said reformatted data from said data collector process module, to apply intrusion rules to said reformatted data, and to generate results; and a display management process module to format said results into display data.

28. The system as recited in claim 27, further comprising a display device to display said display data to a user.

29. The system as recited in claim 27, wherein said monitoring analyzer module to selectively receives preformatted test data.

30. The system as recited in claim 27, wherein said data transmitted in said network is real-time network data.

31. The system as recited in claim 27, wherein said intrusion rules are applied to said reformatted data to detect anomalies in said data transmitted in said network.

32. The system as recited in claim 27, wherein said intrusion rules are applied to detect events indicating attempted intrusions into said network.

33. The system as recited in claim 27, wherein said intrusion rules are applied to detect events indicating attempted tampering with said network.

34. The system as recited in claim 27, further comprising an intrusion log to maintain a time-stamped history of said results.

35. The system as recited in claim 27, further comprising a topology database to store information related to said network.

36. The system as recited in claim 35, wherein said information represents at least one of a topology of said network and interconnectivity of said network.

37. The system as recited in claim 35, wherein said topology database to stores said intrusion rules.

38. The system as recited in claim 27, wherein said network is a telecommunications signaling network and said data is telecommunications signaling network messages.

39. The system as recited in claim 38, wherein said telecommunication signaling network is a signaling system 7 network and said telecommunications signaling network messages are signaling system 7 messages.

* * * * *

UNITED STATES PATENT AND TRADEMARK OFFICE
CERTIFICATE OF CORRECTION

PATENT NO. : 6,711,127 B1  Page 1 of 1
DATED : March 23, 2004
INVENTOR(S) : David B. Gorman et al.

It is certified that error appears in the above-identified patent and that said Letters Patent is hereby corrected as shown below:

<u>Column 4,</u>
Line 31, delete "he" and insert -- the --

<u>Column 5,</u>
Line 42, delete "in put" and insert -- input --
Line 50, delete "most" and insert -- of the most --

<u>Column 10,</u>
Lines 12 and 34, delete "to"

Signed and Sealed this

First Day of June, 2004

JON W. DUDAS
*Acting Director of the United States Patent and Trademark Office*